US012565275B2

(12) United States Patent
Shiang et al.

(10) Patent No.: US 12,565,275 B2
(45) Date of Patent: Mar. 3, 2026

(54) BICYCLE SEAT CUSHION SENSING SYSTEM

(71) Applicant: NATIONAL TAIWAN NORMAL UNIVERSITY, Taipei (TW)

(72) Inventors: Tzyy-Yuang Shiang, Taipei (TW); Ya-Ju Chang, Taipei (TW); Tsang-Hai Huang, Taipei (TW); Chia-Hsiang Chen, Taipei (TW); Yin-Shin Lee, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 171 days.

(21) Appl. No.: 18/519,111

(22) Filed: Nov. 27, 2023

(65) Prior Publication Data

US 2025/0171098 A1     May 29, 2025

(51) Int. Cl.
  B62J 1/28     (2006.01)
  B62J 45/20     (2020.01)
  B62J 45/42     (2020.01)
(52) U.S. Cl.
  CPC ................. B62J 1/28 (2013.01); B62J 45/20 (2020.02); B62J 45/42 (2020.02)
(58) Field of Classification Search
  CPC ....... B62J 1/28; B62J 1/00; B62J 45/00; B62J 45/40; B62J 45/42

USPC .......................................... 297/195.1–215.15
See application file for complete search history.

(56) References Cited

U.S. PATENT DOCUMENTS

| | | | | |
|---|---|---|---|---|
| 11,649,003 B2 * | 5/2023 | Hara | .................... | B62J 45/4152 |
| | | | | 297/215.13 |
| 11,649,004 B2 * | 5/2023 | Palaniswamy | ........... | B62J 1/007 |
| | | | | 297/195.1 |
| 2008/0001444 A1 * | 1/2008 | Wu | ............................. | B62J 6/04 |
| | | | | 297/195.1 |
| 2022/0315161 A1 * | 10/2022 | Katayama | ............. | B60T 8/1706 |
| 2022/0379995 A1 * | 12/2022 | Nagata | ..................... | B62J 45/40 |
| 2023/0083770 A1 * | 3/2023 | Kurotobi | .................. | B62J 45/41 |
| | | | | 701/2 |
| 2024/0328885 A1 * | 10/2024 | Hsieh | .................... | G06F 3/0418 |
| 2025/0055057 A1 * | 2/2025 | Sessions | .................. | B62M 6/90 |

FOREIGN PATENT DOCUMENTS

| | | | | | |
|---|---|---|---|---|---|
| TW | 202517215 A | * | 5/2025 | | |
| WO | WO-2025112094 A1 | * | 6/2025 | ........... | G06F 3/0414 |

* cited by examiner

*Primary Examiner* — Jose V Chen
(74) *Attorney, Agent, or Firm* — WPAT, PC

(57) ABSTRACT
A bicycle seat cushion sensing system includes a seat cushion body. Different sensing devices can be installed in different areas of the seat cushion body to detect the vertical force data of different areas, and the vertical force data of different areas are used to calculate a real-time force center position value, and then the real-time force center position value is converted into a trunk angle value to determine the riding posture of the rider.

10 Claims, 14 Drawing Sheets

Vertical Force(kg)

BICYCLE SEAT CUSHION SENSING SYSTEM

BACKGROUND OF THE PRESENT INVENTION

Field of the Present Invention

The present invention relates to a bicycle seat cushion sensing system, in particular to a seat cushion used for bikes or bicycles, which can detect vertical forces in different areas, use different vertical forces to perform calculations for obtaining the force center position, and determine the riding position based on the force center position.

Description of the Related Art

In general, the design of the seat cushion on a bike or bicycle often has a significant impact on the riding posture. Nowadays, the adjustment of the riding posture is mostly performed by photographing the rider through a camera and utilizing image recognition software for identification and determination. However, this method is expensive and can only be analyzed indoors. If used outdoors, it is very difficult to detect and analyze the posture measurement and judgment of the rider's actual riding.

Therefore, if different sensing devices can be installed in different areas of the seat cushion body to detect the vertical force data of different areas, and the vertical force data of different areas are used to calculate a real-time force center position value, and then the real-time force center position value is converted into a trunk angle value, the actual riding posture of the rider will be determined. Based on the foregoing, the present invention should be an optimal solution.

BRIEF SUMMARY OF THE PRESENT INVENTION

The bicycle seat cushion sensing system of the present invention includes: a seat cushion body, having a front-end area, a left-end area and a right-end area on a surface of the seat cushion body, wherein the front-end area is located at a front end of the left-end area and the right-end area, the left-end area corresponds to a left-side ischium of a human body, and the right-end area corresponds to a right-side ischium of the human body; a front sensing unit, comprising at least one front sensing device, wherein the front sensing device is disposed in the front-end area to detect a front-end vertical force data of the front-end area; a back sensing unit, comprising at least one first back sensing device and at least one second back sensing device, wherein the first back sensing device is disposed in the left-end area to detect a left-end vertical force data of the left-end area, the second back sensing device is disposed in the right-end area to detect a right-end vertical force data of the right-end area, and a position of the second back sensing device corresponds to a position of the first back sensing device; a circuit board, disposed on the seat cushion body, wherein the circuit board is electrically connected to the front sensing device, the first back sensing device and the second back sensing device, the circuit board comprises at least one microprocessor and a transmission unit, the circuit board receives the front-end vertical force data, the left-end vertical force data and the right-end vertical force data, and the microprocessor stores a sensing device distance data, calculates a real-time force center position value through the front-end vertical force data, the left-end vertical force data, the right-end vertical force data and the sensing device distance data, and transmits the real-time force center position value through the transmission unit; and an electronic device, having a riding application, wherein the electronic device is connected to the circuit board to receive the real-time force center position value transmitted by the circuit board and convert the real-time force center position value into a trunk angle value.

The bicycle seat cushion sensing system of the present invention includes: a seat cushion body, having a front-end area, a left-end area and a right-end area on a surface of the seat cushion body, wherein the front-end area is located at a front end of the left-end area and the right-end area, the left-end area corresponds to a left-side ischium of a human body, and the right-end area corresponds to a right-side ischium of the human body; a front sensing unit, comprising at least one front sensing device, wherein the front sensing device is disposed in the front-end area to detect a front-end vertical force data of the front-end area; a back sensing unit, comprising at least one first back sensing device and at least one second back sensing device, wherein the first back sensing device is disposed in the left-end area to detect a left-end vertical force data of the left-end area, the second back sensing device is disposed in the right-end area to detect a right-end vertical force data of the right-end area, and a position of the second back sensing device corresponds to a position of the first back sensing device; a circuit board, disposed on the seat cushion body, wherein the circuit board is electrically connected to the front sensing device, the first back sensing device and the second back sensing device, the circuit board comprises at least one microprocessor and a transmission unit, the circuit board receives the front-end vertical force data, the left-end vertical force data and the right-end vertical force data, and transmits the front-end vertical force data, the left-end vertical force data and the right-end vertical force data through the transmission unit; and an electronic device, having a riding application, wherein the electronic device is connected to the circuit board to receive the front-end vertical force data, the left-end vertical force data and the right-end vertical force data, the riding application stores a sensing device distance data, calculates real-time force center position value through the front-end vertical force data, the left-end vertical force data, the right-end vertical force data and the sensing device distance data, and convert the real-time force center position value into a trunk angle value.

More specifically, the riding application sums the left-end vertical force data and the right-end vertical force data into a back vertical force value, sums the front-end vertical force data, the left-end vertical force data and the right-end vertical force data into a total vertical force value, divides the back vertical force value by the total vertical force value to obtain a vertical force ratio, multiplies the sensing device distance data by the vertical force ratio to obtain the real-time force center position value, wherein the sensing device distance data is a distance between the front sensing unit and the back sensing unit.

More specifically, the riding application adds the front-end vertical force data and the left-end vertical force data to obtain a total left-side vertical force value, divides the left-end vertical force data by the total left-side vertical force value to obtain a left-side force center position value, adds the front-end vertical force data and the right-end vertical force data to obtain a total right-side vertical force value, and divides the right-end vertical force data by the total right-side vertical force value to obtain a right-side force center position value.

More specifically, the riding application compares the left-side force center position value and the right-side force center position value. Suppose a difference between the left-side force center position value and the right-side force center position value is greater than a predetermined standard. In that case, the riding application determines that the left and right sides of the seat cushion body are not symmetrical.

More specifically, the riding application is configured to have an upright posture angle value, an upright posture force center position value, a prone posture angle value, and a prone posture force center position value, wherein the riding application subtracts the prone posture angle value from the upright posture angle value to obtain an angle difference, subtracts the prone posture force center position value from the upright posture force center position value to obtain a predetermined force center position difference value, subtracts the real-time force center position value from the upright posture force center position value to obtain a real-time force center position difference value, divides the real-time force center position difference value by the predetermined force center position difference value to obtain a force center position ratio, multiplies the angle difference value by the force center position ratio to obtain an angle change value, and subtracts the angle change value from the upright posture angle value to obtain the trunk angle value.

More specifically, the riding application stores a plurality of vertical force data as a vertical force change data, extracts a plurality of vertical force peak values from the vertical force change data, extracts a time difference between two vertical force peak values, and divides 60 by the time difference to obtain a pedaling frequency value.

DETAILED DESCRIPTION OF THE PRESENT INVENTION

Other technical contents, features and effects of the present invention will be clearly presented in the following detailed description of the preferred embodiment with reference to the drawings.

With respect to the present invention, the following electrical connection refers to the act of connecting by means of a wired or wireless connection to enable the generation of unidirectional or bi-directional transmission of digital and/or analog signals between electronic components.

Regarding the microprocessor described below in the present invention, it is an MCU (Micro Controller Unit), which contains at least a CPU, memory (e.g., ROM and RAM), and peripheral devices (e.g., ADCs, DACs, GPIOs, and PWMs). Actions, instructions, variables, and other information can be programmed are written into the memory, and then the CPU executes the programmed actions in sequence.

Figure 1:
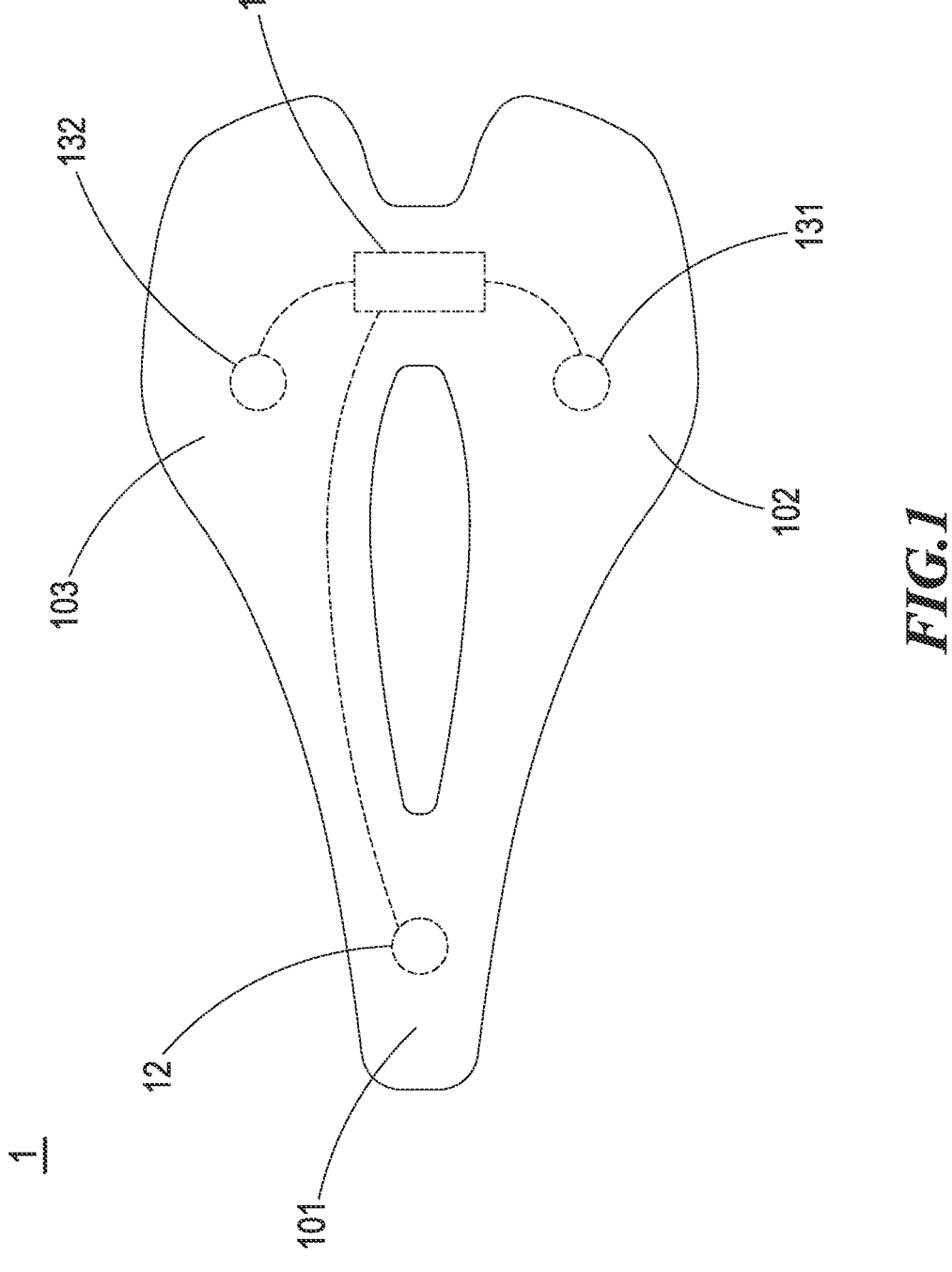
FIG. 1 is a structural schematic diagram of the seat cushion body of the bicycle seat cushion sensing system according to the present invention.
Figure 2A:
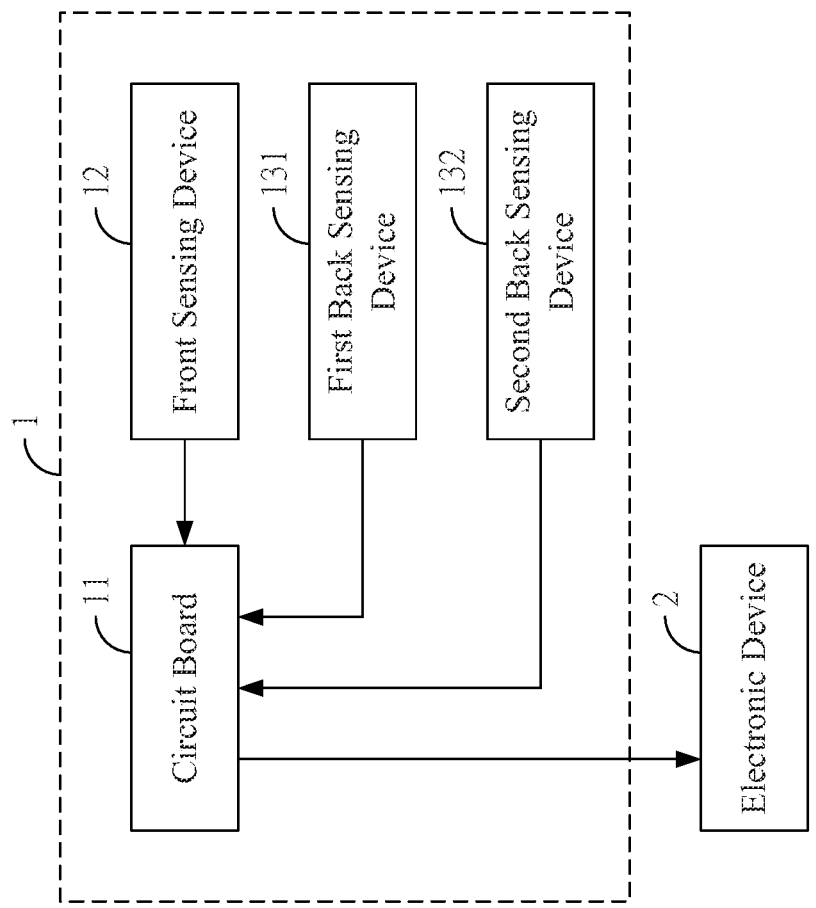
FIG. 2A is an architectural schematic diagram of the seat cushion body of the bicycle seat cushion sensing system according to the present invention.

Please refer to FIGS. 1 and 2A, which are structural schematic diagrams and architectural schematic diagrams of the seat cushion body of the bicycle seat cushion sensing system. As shown in FIG. 2A, the bicycle seat cushion sensing system includes a seat cushion body 1 and an electronic device 2. As shown in FIG. 1, the seat cushion body 1 is a seat cushion that can be installed on a bike/bicycle. The surface of the seat cushion body 1 is divided into a front-end area 101, a left-end area 102, and a right-end area 103.

The front-end area 101 is located at the front end of the left-end area 102 and the right-end area 103. The front end refers to the direction in which the rider leans over, and the front-end area 101 is further located between the stem axis of the bike/bicycle and the left-end area 102 and the right-end area 103. The left-end region 102 corresponds to the left-side ischium of the human body, and the right-end region 103 corresponds to the right-side ischium of the human body.

In the present invention, a front sensing unit and a back sensing unit are arranged on the seat cushion body 1. The front sensing unit is located in the front-end area 101 (embedded inside the front-end area 101 of the seat cushion body 1 or provided on the surface of the front-end area 101). The back sensing unit is located in the left-end area 102 and the right-end area 103 (embedded inside the left-end area 102 and right-end area 103 of the seat cushion body 1).

The front sensing unit includes at least one front sensing device 12. The front sensing device 12 is disposed in the front-end area 101 for detecting the front-end vertical force data of the front-end area 101.

The front sensing device 12 is a force sensor (Linear strain gauges) (such as SGD-10/120-LY11, OMEGA, USA).

The back sensing unit includes at least one first back sensing device 131 and at least one second back sensing device 132.

The first back sensing device 131 is disposed of in the left-end region 102 (embedded inside the left-end region 102 of the seat cushion body 1 or disposed on the surface of the left-end region 102) for detecting the left-end vertical force data of the left-end region 102.

The second back sensing device 132 is disposed of in the right-end area 103 (embedded inside the right-end area 103 of the seat cushion body 1 or disposed on the surface of the right-end area 103) for detecting the right-end vertical force data of the right-end area 103. The position of the second back sensing device 132 corresponds to the position of the first back sensing device 131.

The first back sensing device 131 and the second back sensing device 132 are force sensors (Linear strain gauges) (such as SGD-10/120-LY11, OMEGA, USA).

The seat cushion body 1 is further provided with a circuit board 11. The circuit board 11 is electrically connected to the front sensing device 12, the first back sensing device 131 and the second back sensing device 132, in order to transmit the front-end vertical force data, the left-end vertical force data, and the right-end vertical force data to the circuit board 11.

The front sensing device 12, the first back sensing device 131 and the second back sensing device 132 can be electrically connected to the circuit board 11 individually. Alternatively, multiple identical or different sensing devices can be connected in series, and then be electrically connected to the circuit board 11. The electrical connection can be realized through a cable or the like, or in accordance with electronic circuit wiring connection.

Figure 2B:
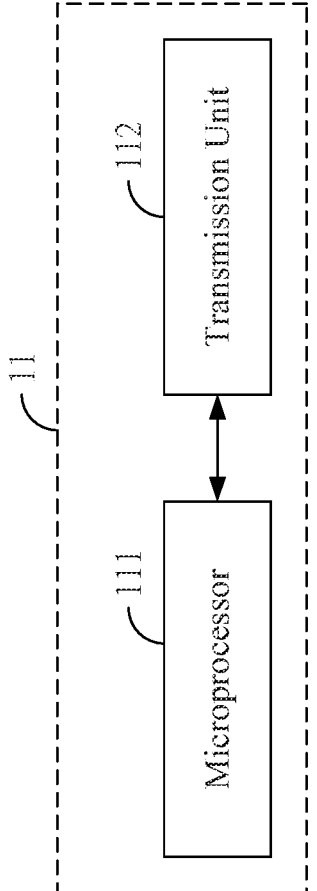
FIG. 2B is an architectural schematic diagram of the circuit board of the bicycle seat cushion sensing system according to the present invention.

As shown in FIG. 2B, the circuit board 11 has at least one microprocessor 111 and a transmission unit 112. The microprocessor 111 stores a sensing device distance data (the sensing device distance data indicates the distance between the front sensing unit and the back sensing unit), calculates a real-time force center position value through the front-end vertical force data, the left-end vertical force data, the right-end vertical force data, and the sensing device distance data, and transmits the real-time force center position value through the transmission unit 112.

Figure 3:
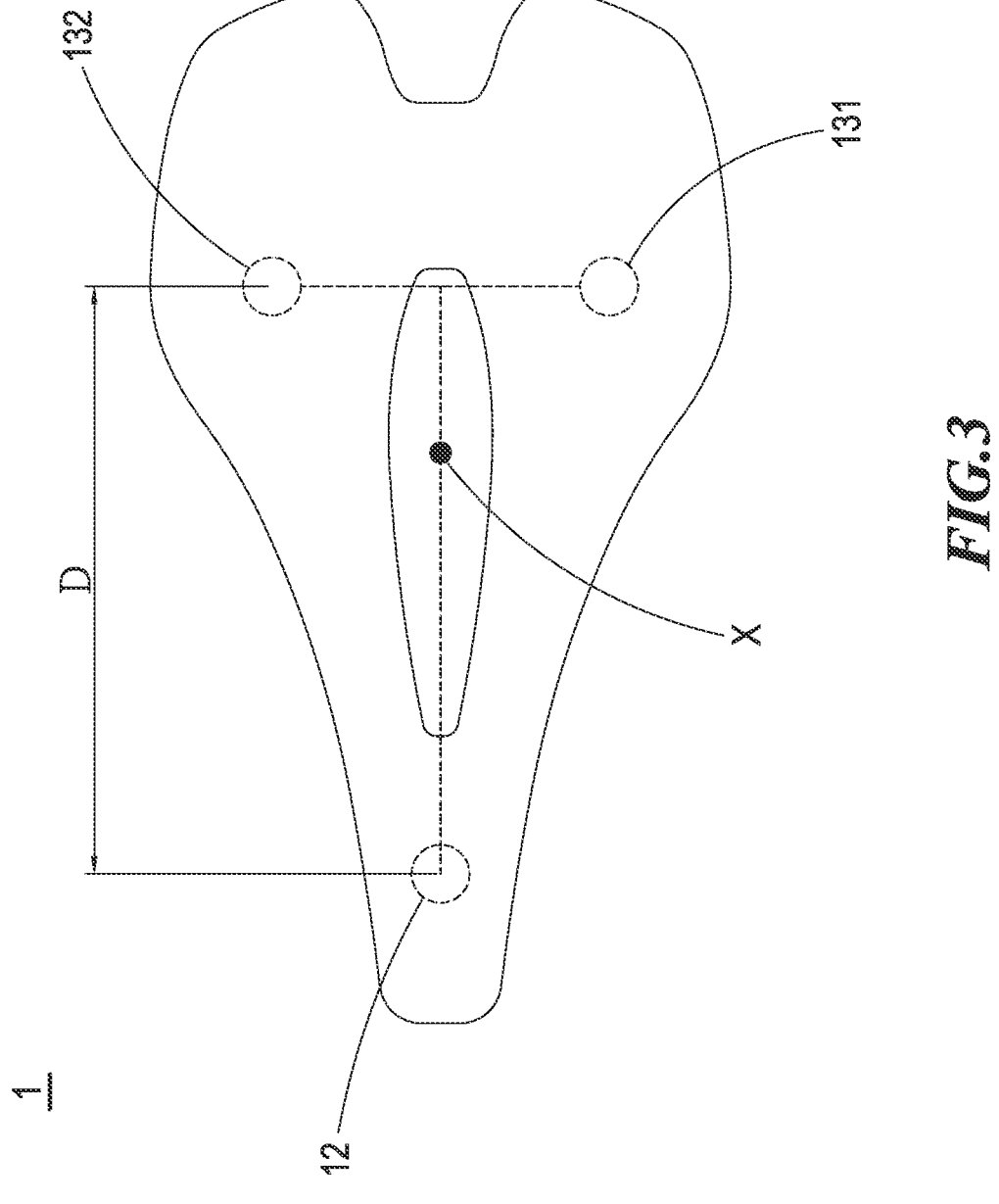
FIG. 3 is a schematic diagram of implementing the force center position of the bicycle seat cushion sensing system according to the present invention.

As shown in FIG. 3, the distance between the front and back sensing devices (the sensing device distance data (D)) can be measured in advance. Since the first back sensing device 131 and the second back sensing device 132 must be arranged symmetrically, the positions have corresponded so that the middle point (back middle point) can be obtained between the first back sensing device 131 and the second back sensing device 132, and then the distance between the front sensing device 12 and the back middle point can be measured as the sensing device distance data (D).

The microprocessor 111 performs the calculation steps for the real-time force center position value as follows:
(1) Sum the left-end vertical force data and the right-end vertical force data into a back vertical force value;
(2) Sum the front-end vertical force data, the left-end vertical force data, and the right-end vertical force data into a total vertical force value;
(3) Divide the back vertical force value by the total vertical force value to obtain a vertical force ratio;

(4) Multiple sensing device distance data by the vertical force ratio to obtain the real-time force center position value (X).

The transmission unit 112 of the circuit board 11 is connected to the electronic device 2 by wired or wireless means. The wired connection is connected between the circuit board 11 and the electronic device 2 through a transmission line. The wireless connection is based on wireless transmission technologies such as WIFI, Bluetooth, or Infrared.

Figure 2C:
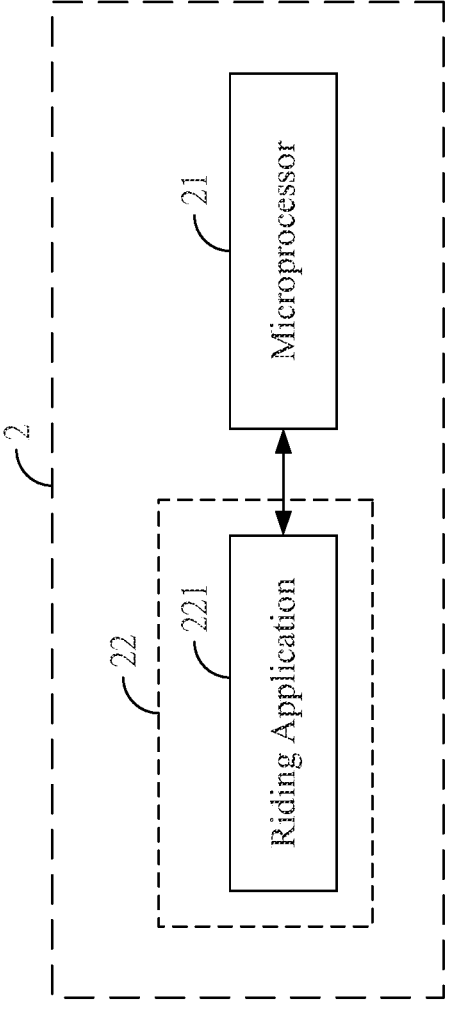
FIG. 2C is an architectural schematic diagram of the electronic device of the bicycle seat cushion sensing system according to the present invention.

As shown in FIG. 2C, the electronic device 2 includes at least one microprocessor 21 and at least one computer-readable recording medium 22. The computer-readable recording medium 22 includes a riding application program 221. The computer-readable recording medium 22 further stores computer-readable instructions. When the microprocessor 21 executes the computer-readable instructions, the riding application 221 can be operated.

The electronic device 2 can be a smartphone, a tablet computer, a portable electronic device, a notebook computer, or an electronic device with a connection function.

The electronic device 2 is connected to the circuit board 11 for receiving the real-time force center position value calculated by the circuit board 11 and converting the real-time force center position value into a trunk angle value through the riding application 221.

Figure 2D:
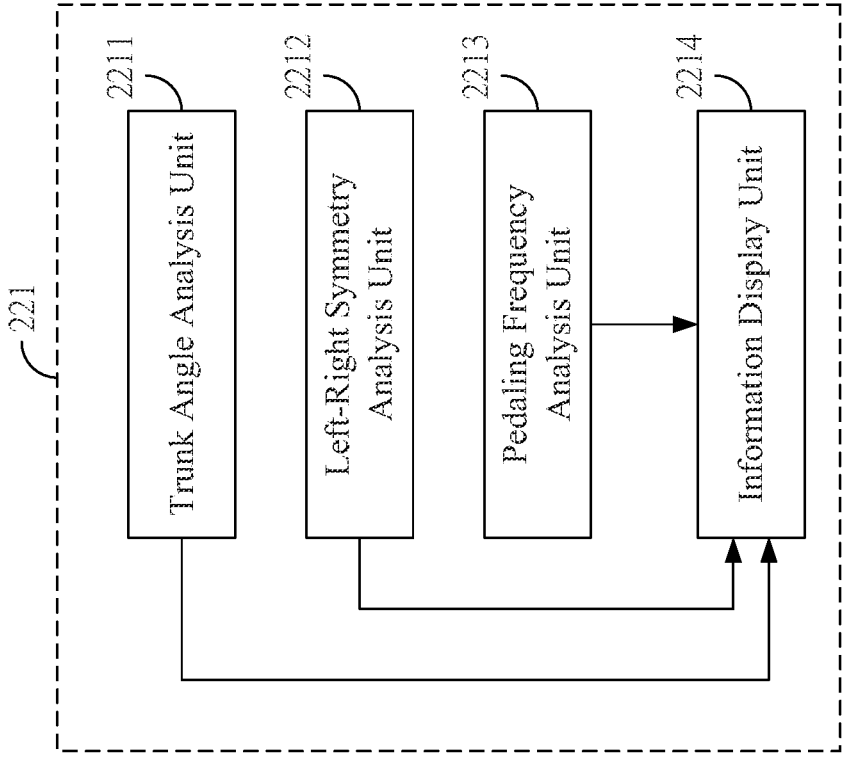
FIG. 2D is an architectural schematic diagram of the riding application of the bicycle seat cushion sensing system according to the present invention.

As shown in FIG. 2D, the riding application 221 at least includes a trunk angle analysis unit 2211, a left-right symmetry analysis unit 2212, a pedaling frequency analysis unit 2213, and an information display unit 2214. The trunk angle analysis unit 2211, the left-right symmetry analysis unit 2212, and the pedaling frequency analysis unit 2213 are electrically connected to the information display unit 2214.

The trunk angle analysis unit 2211 is used to analyze and calculate the trunk angle value. The trunk angle analysis unit 2211 can be configured to input or store an upright posture angle value, an upright posture force center position value, a prone posture angle value, and a prone posture force center position value.

Figure 4A:
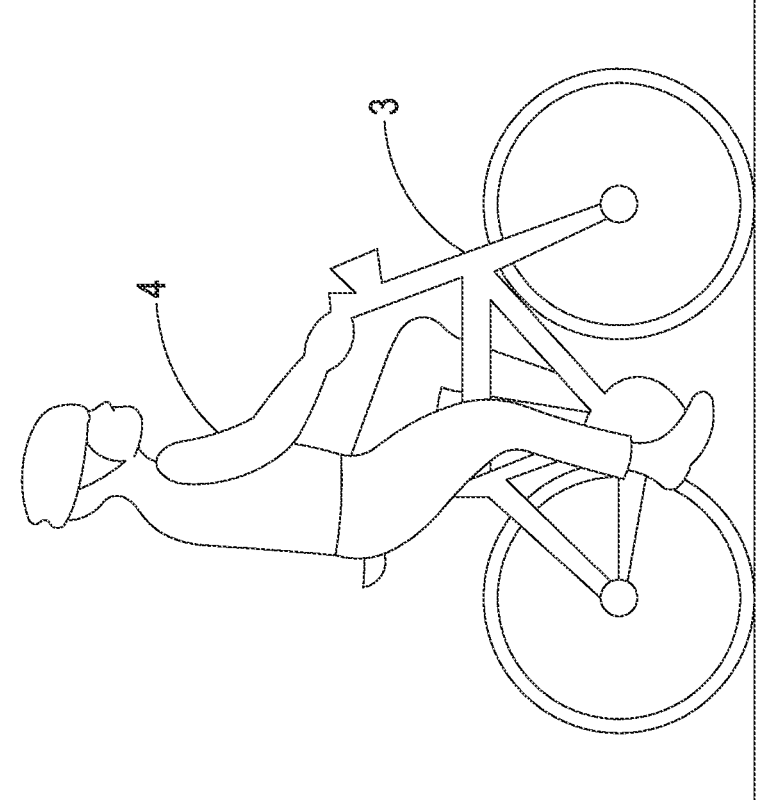
FIG. 4A is a schematic diagram of riding in an upright posture of the bicycle seat cushion sensing system according to the present invention.
Figure 4B:
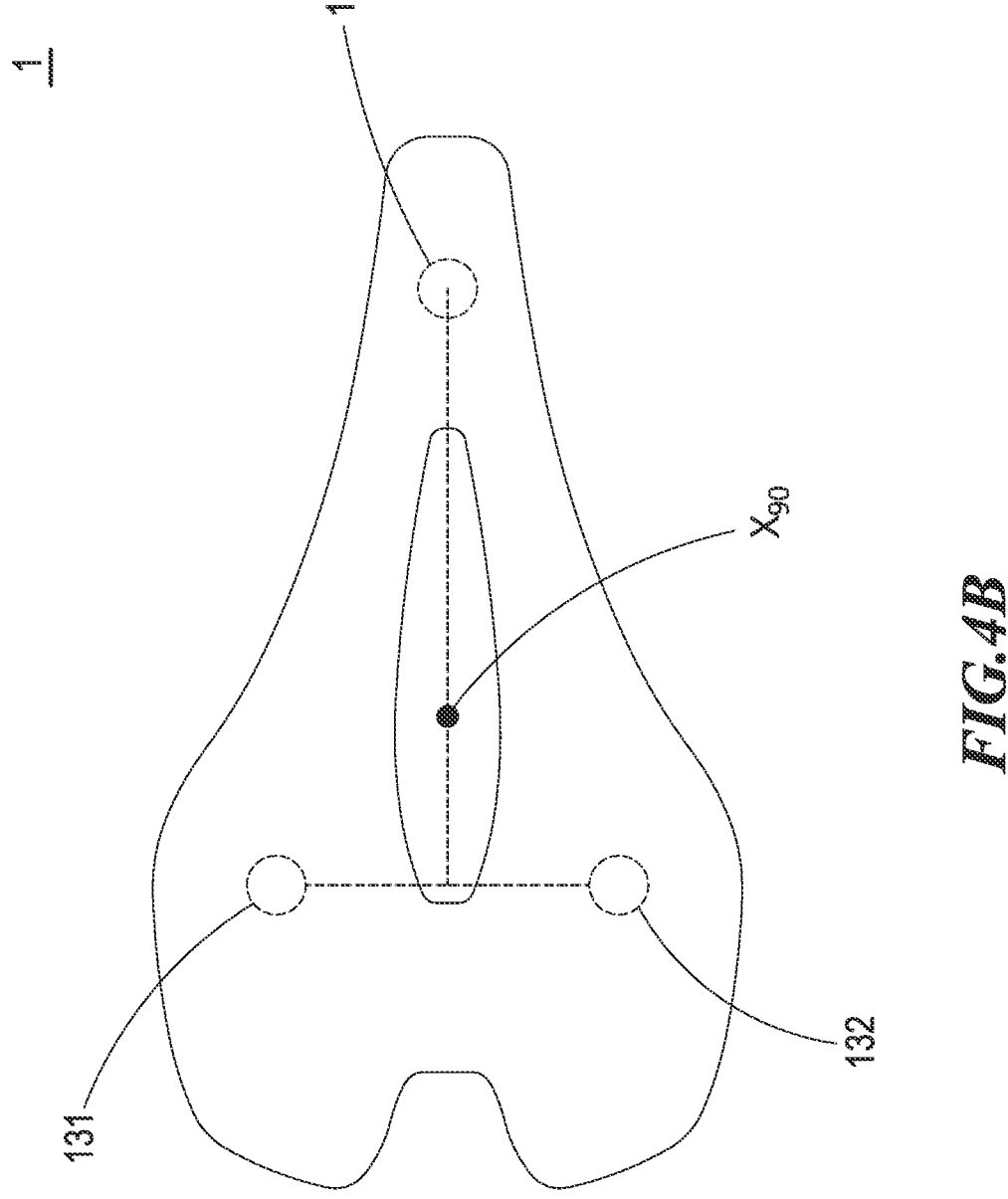
FIG. 4B is a schematic diagram of implementing the force center position of the upright posture of the bicycle seat cushion sensing system according to the present invention.

As shown in FIGS. 4A and 4B, the rider 4 sits on the seat cushion body 1 of the bicycle 3. Afterwards, the rider 4 is first in an upright posture to measure the upright posture force center position value. In the embodiment of the present invention, the upright posture angle value is set to 90 degrees to measure the upright posture force center position value ($X_{90}$).

Figure 5A:
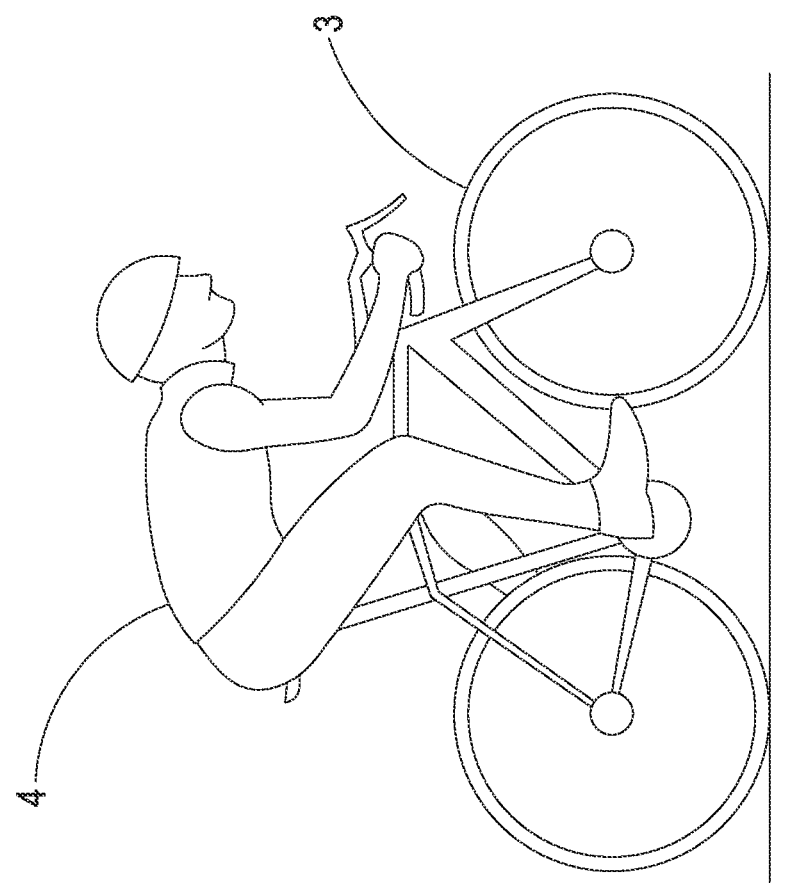
FIG. 5A is a schematic diagram of riding in the prone posture of the bicycle seat cushion sensing system according to the present invention.
Figure 5B:
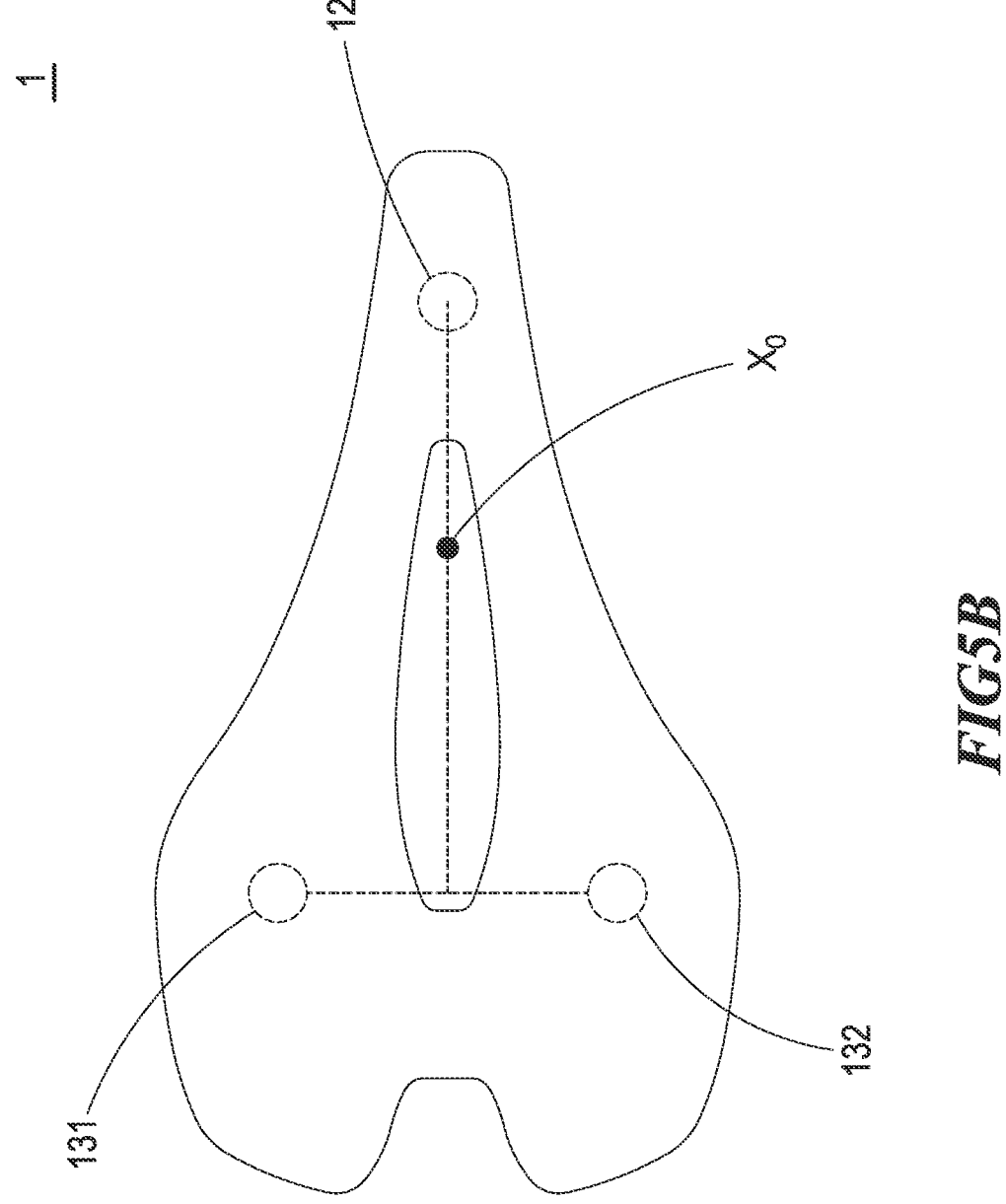
FIG. 5B is a schematic diagram of implementing the force center position of the prone posture of the bicycle seat cushion sensing system according to the present invention.

As shown in FIGS. 5A and 5B, the rider 4 sits on the seat cushion body 1 of the bicycle 3. Afterwards, the rider 4 is first in a prone posture to measure the prone posture force center position value. In the embodiment of the present invention, the prone posture angle value is set to 0 degrees to measure the prone posture force center position value ($X_0$).

The upright posture angle value and the prone posture angle value of the present invention can be changed based on needs. The values are mainly used to define the maximum angle range of the riding posture. The upright posture angle value is the maximum value, and the prone posture angle value is the minimum value. The prone posture angle value can be a negative angle.

The trunk angle value can be analyzed and calculated by the trunk angle analysis unit 2211 as follows:
(1) Subtract the prone posture angle value from the upright posture angle value to obtain an angle difference value;
(2) Subtract the prone posture force center position value from the upright posture force center position value to obtain a predetermined force center position difference value ($X_{upright}$–$X_{prone}$). The predetermined force center position difference value has to be processed in absolute terms so that the predetermined force center position difference value is positive;

(3) Subtract the real-time force center position value from the upright posture force center position value to obtain a real-time force center position difference value ($X_{upright}$–X);

(4) Divide the real-time force center position difference value by the predetermined force center position difference value to obtain a force center position ratio;

(5) Multiply the angle difference value by the force center position ratio to obtain an angle change value;

(6) Subtract the angle change value from the upright posture angle value to obtain the trunk angle value.

Figure 6:
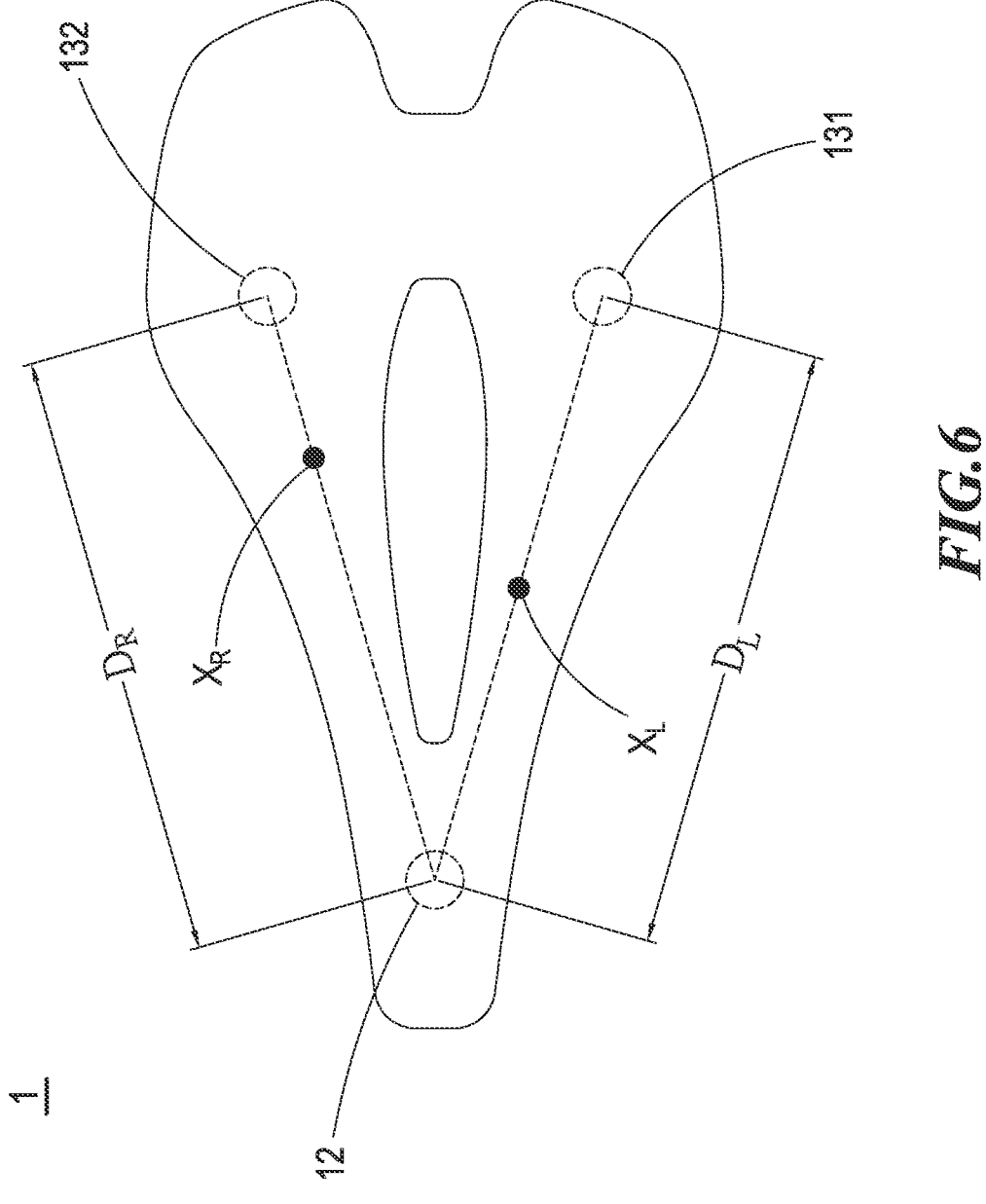
FIG. 6 is a schematic diagram of implementing the force center position of the left and right symmetry of the bicycle seat cushion sensing system according to the present invention.

The left-right symmetry analysis unit 2212 is used to determine whether the left and right sides of the seat cushion body are symmetrical. For the microprocessor 111, the steps for calculating the left-side force center position value and the right-side force center position value are illustrated in FIG. 6 as follows:

(1) Add the front-end vertical force data to the left-end vertical force data of the first back sensing device 131 to obtain a total left-side vertical force value;

(2) Divide the left-end vertical force data by the total left-side vertical force value to obtain a left-side vertical force ratio;

(3) Multiply the left-side sensing device distance data (DL) by the left-side vertical force ratio to obtain the left-side force center position value (XL);

(4) Add the front-end vertical force data to the right-end vertical force data of the second back sensing device 132 to obtain a total right-side vertical force value;

(5) Divide the right-end vertical force data by the total right-side vertical force value to obtain a right-side vertical force ratio;

(6) Multiply the right-side sensing device distance data (DR) by the right-side vertical force ratio to obtain the right-side force center position value (XR).

The microprocessor 111 transmits the left-side force center position value and the right-side force center position value to the electronic device 2. The left-right symmetry analysis unit 2212 compares the left-side force center position value and the right-side force center position value. Suppose the difference between the left-side force center position value and the right-side force center position value is greater than a predetermined standard. In that case, the riding application determines that the left and right sides of the seat cushion body are not symmetrical.

The above predetermined standard is 20% of the right-side sensing device distance data (DR) or 20% of the left-side sensing device distance data (DL). If the comparison value obtained after comparing XR and XL (take the absolute value of the comparison value, if the comparison value is –30, after taking the absolute value, it will be 30) is greater than the predetermined standard, then it is determined that the left and right sides of the seat cushion body are not symmetrical.

The pedaling frequency analysis unit 2213 stores a plurality of vertical force data (the circuit board can further transmit the front-end vertical force data, the left-end vertical force data, and the right-end vertical force data to the electronic device 2) as a vertical force change data, extracts several vertical force peak values from the vertical force change data, extracts the time difference between the two vertical force peak values, and then divide 60 by the time difference to obtain a pedaling frequency value (RPM).

Figure 7:
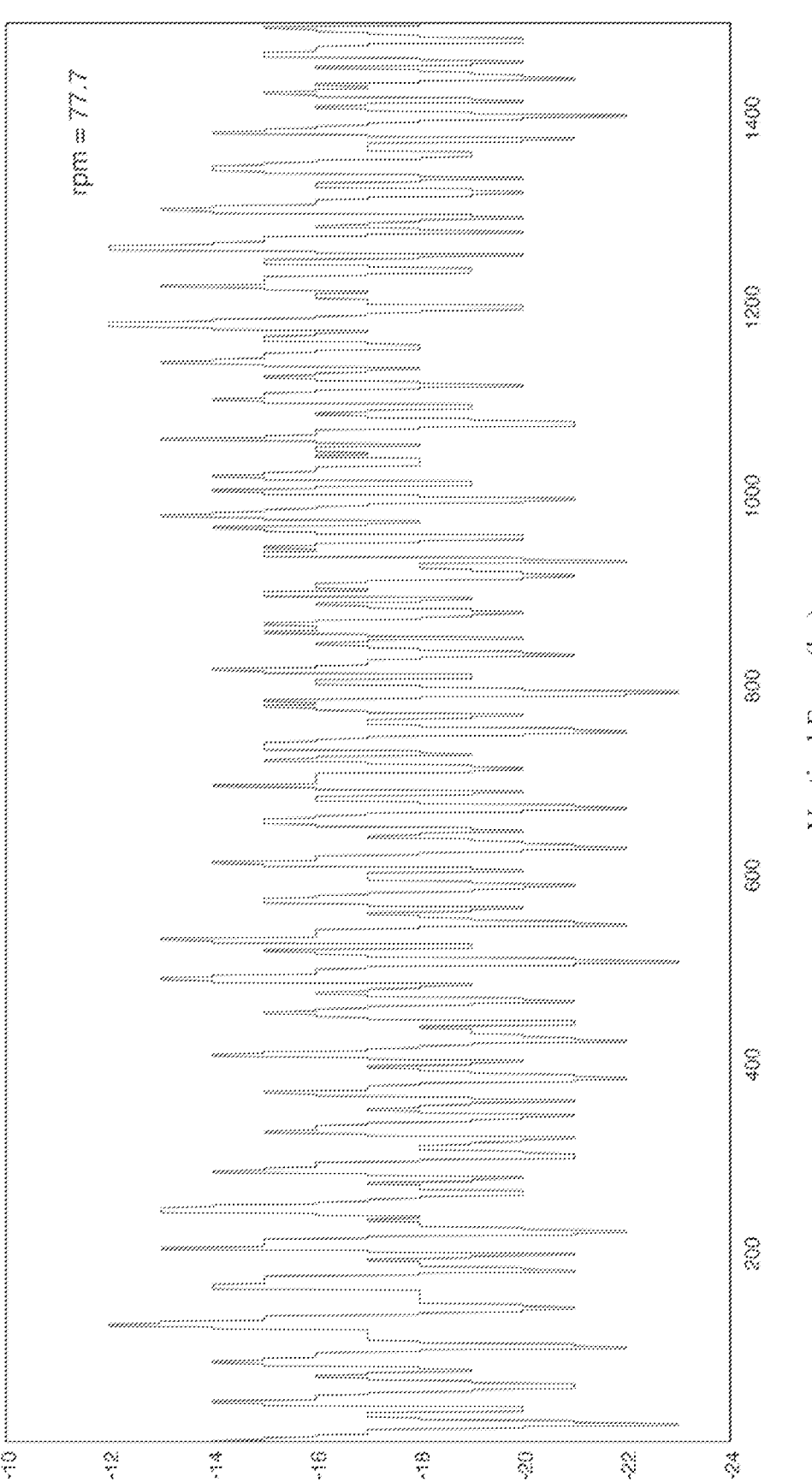
FIG. 7 is another architectural schematic diagram of implementing the seat cushion body of the bicycle seat cushion sensing system according to the present invention.

As shown in FIG. 7, the pedaling results in peak changes between the vertical forces. Therefore, the frequency of vertical force changes is highly correlated with the pedaling frequency. The pedaling frequency can be estimated by using the frequency of changes in vertical force peaks (time between peaks).

The information display unit 2214 is used to display an operation interface on the electronic device 2 for displaying related information such as the real-time force center position value and the trunk angle value. The operation interface is a web interface, a computer software interface, or a handheld device interface.

In order to display information more quickly, a trunk angle conversion table is created through the trunk angle analysis unit 2211, which allows for the creation of different trunk angle ranges corresponding to different ranges of force center position. Two illustrative embodiments have been provided in the present invention. As shown in Table 1, the trunk angle is set in 5-degree intervals to define the range of force center positions. Therefore, the information display unit 2214 can directly display the corresponding trunk angles for different ranges of force center positions based on the trunk angle conversion table. For example, if the real-time force center position value is 10.33, the degree of trunk angle displayed on the operation interface will be 75-70 (however, to display accurate trunk angle information, it must still be calculated and obtained by the trunk angle analysis unit 2211).

TABLE 1

| Trunk Angle Conversion Table | |
| --- | --- |
| Trunk Angle | Force Center Position |
| 90~87.5 | 13~12.67 |
| 87.5~82.5 | 12.67~12 |
| 82.5~77.5 | 12~11.33 |
| 77.5~72.5 | 11.33~10.67 |
| 72.5~67.5 | 10.67~10 |
| 67.5~62.5 | 10~9.33 |
| 62.5~57.5 | 9.33~8.67 |
| 57.5~52.5 | 8.67~8 |
| 52.5~47.5 | 8~7.33 |
| 47.5~42.5 | 7.33~6.67 |
| 42.5~37.5 | 6.67~6 |
| 37.5~32.5 | 6~5.33 |
| 32.5~27.5 | 5.33~4.67 |
| 27.5~22.5 | 4.67~4 |
| 22.5~17.5 | 4~3.33 |
| 17.5~12.5 | 3.33~2.67 |
| 12.5~7.5 | 2.67~2 |
| 7.5~2.5 | 2~1.33 |
| 2.5~0 | 1.33~1 |

In addition to Table 1, a trunk angle conversion table with a wider range can be further established. As shown in Table 2, the trunk angle range is defined as high (60~90), medium (30~60), and low (0~30), so that the information display unit 2214 can directly display the trunk angle inclination degrees (high, medium, low) corresponding to different force center positions based on the trunk angle conversion table in Table 2. For example, the real-time force center position value is 8, then the trunk angle inclination degree displayed on the operation interface is medium.

US 12,565,275 B2

9

TABLE 2

| Trunk Angle Conversion Table | |
| --- | --- |
| Trunk Angle Inclination Degree | Force Center Position |
| High (60~90) | 9~13 |
| Medium(30~60) | 5~9 |
| Low(0~30) | 1~5 |

Figure 8:
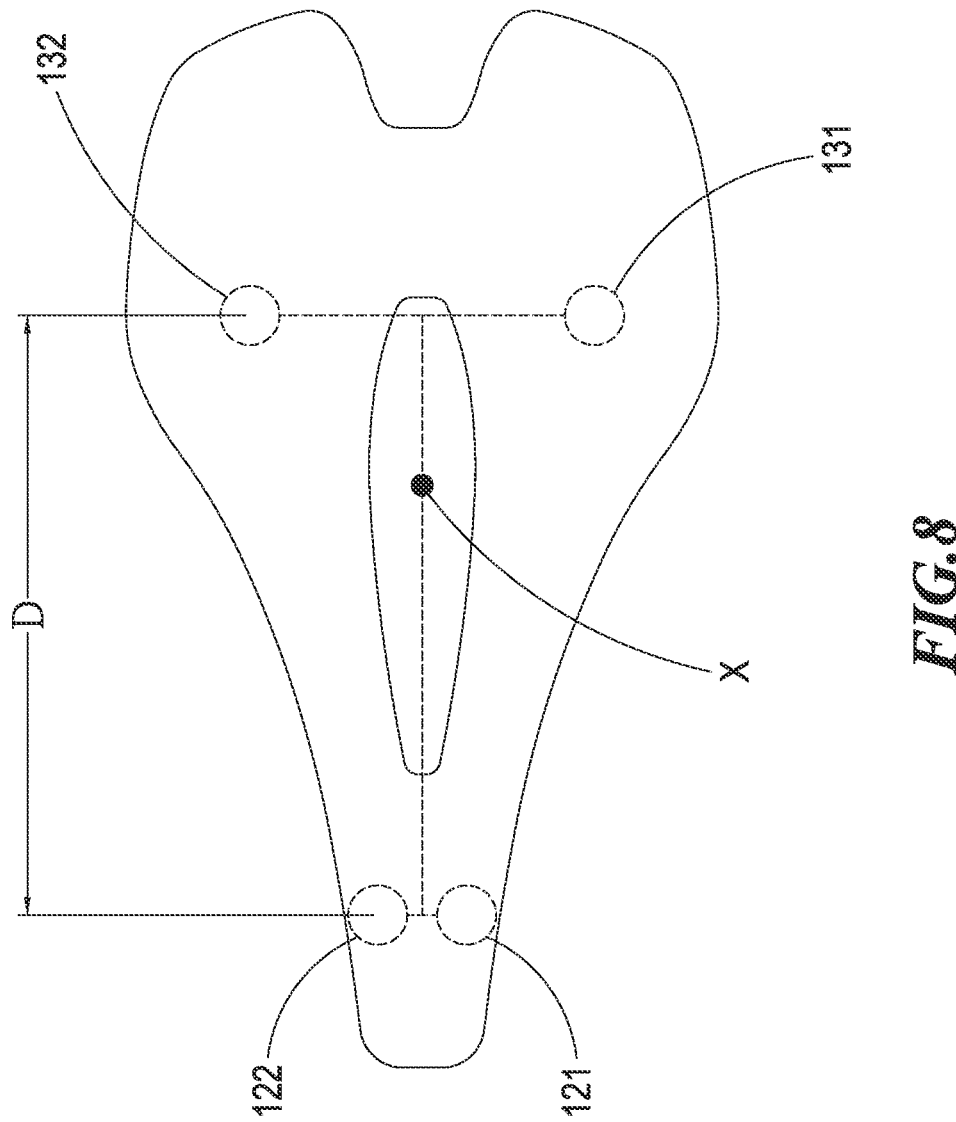
FIG. 8 is a schematic diagram illustrating the pedaling frequency of the seat cushion body of the bicycle seat cushion sensing system according to the present invention.

In addition, as shown in FIG. 8, two front sensing devices (a first front sensing device 121, and a second front sensing device 122) in the front-end area 101 can be arranged in the present invention. When the distance between the front and back sensing devices (sensing device distance data (D)) is to be measured, since the first front sensing device 121 and the second front sensing device 122 are symmetrically arranged, it is available to extract the front center point (the midpoint between the first front sensing device 121 and the second front sensing device 122), the back center point (the midpoint between the first back sensing device 131 and the second back sensing device 132), and then measure the distance between the front center point and the back center point as the sensing device distance data (D).

The first front sensing device 121 can detect the first front vertical force data, and the second front sensing device 122 can detect the second front vertical force data. The calculation steps for the real-time force center position value are as follows:

(1) Sum the first front vertical force data and the second front vertical force data into a front vertical force value;

(2) Sum the left-end vertical force data and the right-end vertical force data into a back vertical force value;

(3) Sum the first front vertical force data, the second front vertical force data, the front-end vertical force data, the left-end vertical force data and the right-end vertical force data into a total vertical force value;

(4) Divide the back vertical force value by the total vertical force value to obtain a vertical force ratio;

(5) Multiply the sensing device distance data by the vertical force ratio to obtain the real-time force center position value (X).

The calculation steps for the left-side force center position value and the right-side force center position value are as follows:

(1) Add the first front vertical force data to the left-end vertical force data to obtain a total left-side vertical force value;

(2) Divide the left-end vertical force data by the total left-side vertical force value to obtain a left-side force center position value;

(3) Add the second front vertical force data to the right-end vertical force data to obtain a total right-side vertical force value;

(4) Divide the right-end vertical force data by the total right-side vertical force value to obtain a right-side force center position value.

Figure 9:
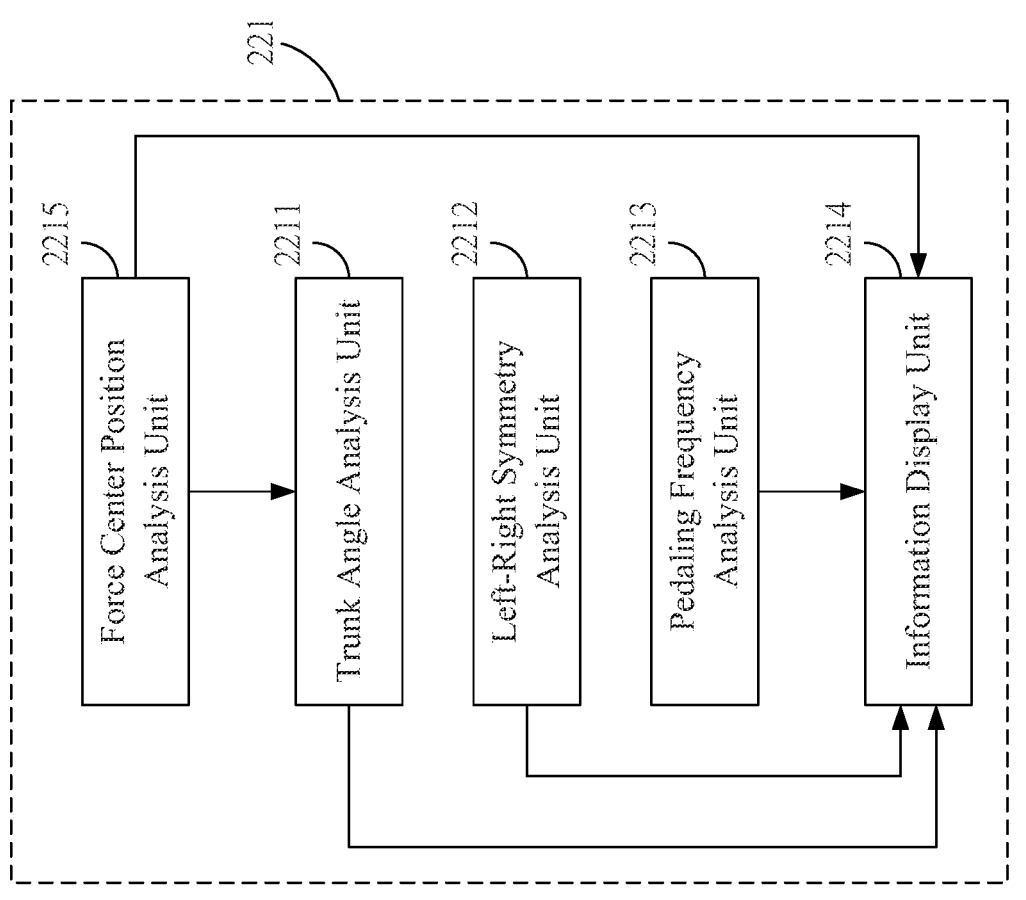
FIG. 9 is another architectural schematic diagram of the riding application of the bicycle seat cushion sensing system according to the present invention.

In addition, the circuit board 11 of the present invention can also directly transmit the front-end vertical force data, the left-end vertical force data and the right-end vertical force data to the electronic device 2, and the riding application 221 of the electronic device 2 can calculate the real-time force center position value. As shown in FIG. 9, the riding application 221 can further have a force center position analysis unit 2215. The force center position analysis unit 2215 stores a sensing device distance data, and calculates a real-time force center position value through the front-end vertical force data, the left-end vertical force data, the right-end vertical force data and the sensing device distance data. Afterwards, the force center position analysis unit 2215 coverts the real-time force center position value into a trunk angle value.

Regarding the steps of calculating the real-time force center position value, as stated in paragraph of the specification of the present invention, the front-end vertical force data, the left-end vertical force data and the right-end vertical force data are summed into a total vertical force value, and the front-end vertical force data is divided by the total vertical force data to obtain a vertical force ratio. Afterwards, the sensing device distance data is multiplied by the vertical force ratio to obtain the real-time force center position value.

Compared with other conventional technologies, the bicycle seat cushion sensing system provided by the present invention provides the following advantages:

(1) In the present invention, different sensing devices can be installed in different areas of the seat cushion body to detect the vertical force data of different areas, and the vertical force data of different areas are used to calculate a real-time force center position value, and then the real-time force center position value is converted into a trunk angle value, so that the actual riding posture of the rider can be determined.

(2) In the present invention, the rider's riding posture can be determined through the position and vertical force of the seat cushion, and the left and right vertical force positions of the seat cushion can be used to determine whether to adjust the rider's riding settings or not. If the difference between the left and right vertical force positions is too large, it is possible that the left and right of the seat cushion need to be adjusted. Alternatively, if the rider's own riding habits result in a large difference between the left and right vertical force positions, it is necessary to adjust the left and right of the seat cushion or conduct adjustments on other portions (e.g., adjust the length of the cranks, the front and back of the seat cushion, the height of the stem, or the front and back of the stem, in order to avoid too large a difference between the left and right vertical force positions).

(3) In the present invention, if the detected difference between left and right vertical force positions is too large, it is possible that the rider is not in a good mental state. If the left and right vertical force positions are within a period of time that the left is greater than the right or the right is greater than the left constantly, it means that the ride is shaking seriously, and a break reminder can be issued through the riding application to inform the rider for stop riding.

(4) In the present invention, the frequency of the vertical force peak can be used to determine the pedaling frequency, and the calculated data (trunk angle, gravity position center, left and right symmetry, left and right vertical force position) can be collected to classify riders and provide various riding reminders and suggestions.

The present invention has been disclosed by the foregoing embodiments, which are not intended to limit the present invention. Any person of ordinary knowledge in the art may make certain changes and modifications in understanding the foregoing technical features and embodiments of the present invention without departing from the spirit and scope of the present invention. Accordingly, the scope of patent protection for the present invention shall be as defined in the claim attached hereto.

What is claimed is:

1. A bicycle seat cushion sensing system, comprising:
a seat cushion body, having a front-end area, a left-end area and a right-end area on a surface of the seat cushion body, wherein the front-end area is located at a front end of the left-end area and the right-end area, the left-end area is disposed at a left side of the seat cushion body, and the right-end area is disposed at a right side of the seat cushion body;
a front sensing unit, comprising at least one front sensing device, wherein the front sensing device is disposed in the front-end area to detect a front-end vertical force data of the front-end area;
a back sensing unit, comprising at least one first back sensing device and at least one second back sensing device, wherein the first back sensing device is disposed in the left-end area to detect a left-end vertical force data of the left-end area, the second back sensing device is disposed in the right-end area to detect a right-end vertical force data of the right-end area, and position of the second back sensing device corresponds to position of the first back sensing device;
a circuit board, disposed on the seat cushion body, wherein the circuit board is electrically connected to the front sensing device, the first back sensing device and the second back sensing device, the circuit board comprises at least one microprocessor and a transmission unit, the circuit board receives the front-end vertical force data, the left-end vertical force data and the right-end vertical force data, and the microprocessor stores a sensing device distance data, calculates a real-time force center position value through the front-end vertical force data, the left-end vertical force data, the right-end vertical force data and the sensing device distance data, and transmits the real-time force center position value through the transmission unit; and
an electronic device, having a riding application, wherein the electronic device is connected to the circuit board to receive the real-time force center position value transmitted by the circuit board and convert the real-time force center position value into a trunk angle value;
wherein the riding application is configured to have an upright posture angle value, an upright posture force center position value, a prone posture angle value, and a prone posture force center position value, wherein the riding application subtracts the prone posture angle value from the upright posture angle value to obtain an angle difference, subtracts the prone posture force center position value from the upright posture force center position value to obtain a predetermined force center position difference value, subtracts the real-time force center position value from the upright posture force center position value to obtain a real-time force center position difference value, divides the real-time force center position difference value by the predetermined force center position difference value to obtain a force center position ratio, multiplies the angle difference value by the force center position ratio to obtain an angle change value, and subtracts the angle change value from the upright posture angle value to obtain the trunk angle value.

2. The cushion sensing system according to claim 1, wherein the microprocessor of the circuit board sums the left-end vertical force data and the right-end vertical force data into a back vertical force value, sums the front-end vertical force data, the left-end vertical force data, and the right-end vertical force data into a total vertical force value, divides the back vertical force value by the total vertical force value to obtain a vertical force ratio, multiplies the sensing device distance data by the vertical force ratio to obtain the real-time force center position value, wherein the sensing device distance data is a distance between the front sensing unit and the back sensing unit.

3. The cushion sensing system according to claim 1, wherein the microprocessor adds the front-end vertical force data and the left-end vertical force data to obtain a total left-side vertical force value, divides the left-end vertical force data by the total left-side vertical force value to obtain a left-side force center position value, adds the front-end vertical force data and the right-end vertical force data to obtain a total right-side vertical force value, and divides the right-end vertical force data by the total right-side vertical force value to obtain a right-side force center position value, and the microprocessor transmits the left-side force center position value and the right-side force center position value to the electronic device.

4. The cushion sensing system according to claim 3, wherein the riding application of the electronic device compares the left-side force center position value and the right-side force center position value, if a difference between the left-side force center position value and the right-side force center position value is greater than a predetermined standard, the riding application determines that the left and right sides of the seat cushion body are not symmetrical.

5. The cushion sensing system according to claim 1, wherein the circuit board is further capable of transmitting the front-end vertical force data, the left-end vertical force data and the right-end vertical force data to the electronic device, and wherein the riding application of the electronic device stores a plurality of vertical force data as a vertical force change data, extracts a plurality of vertical force peak values from the vertical force change data, extracts a time difference between two vertical force peak values, and divides 60 by the time difference to obtain a pedaling frequency value.

6. A bicycle seat cushion sensing system, comprising:
a seat cushion body, having a front-end area, a left-end area and a right-end area on a surface of the seat cushion body, wherein the front-end area is located at a front end of the left-end area and the right-end area, the left-end area is disposed at a left side of the seat cushion body, and the right-end area is disposed at a right side of the seat cushion body;
a front sensing unit, comprising at least one front sensing device, wherein the front sensing device is disposed in the front-end area to detect a front-end vertical force data of the front-end area;
a back sensing unit, comprising at least one first back sensing device and at least one second back sensing device, wherein the first back sensing device is disposed in the left-end area to detect a left-end vertical force data of the left-end area, the second back sensing device is disposed in the right-end area to detect a right-end vertical force data of the right-end area, and position of the second back sensing device corresponds to position of the first back sensing device;
a circuit board, disposed on the seat cushion body, wherein the circuit board is electrically connected to the front sensing device, the first back sensing device, and the second back sensing device, the circuit board comprises at least one microprocessor and a transmission unit, the circuit board receives the front-end vertical force data, the left-end vertical force data and the right-end vertical force data, and transmits the front-end vertical force data, the left-end vertical force data, and the right-end vertical force data through the transmission unit; and an electronic device, having a riding application, wherein the electronic device is connected to the circuit board to receive the front-end vertical force data, the left-end vertical force data, and the right-end vertical force data, the riding application stores a sensing device distance data, calculates real-time force center position value through the front-end vertical force data, the left-end vertical force data, the right-end vertical force data and the sensing device distance data, and convert the real-time force center position value into a trunk angle value;

wherein the riding application is configured to have an upright posture angle value, an upright posture force center position value, a prone posture angle value, and a prone posture force center position value, wherein the riding application subtracts the prone posture angle value from the upright posture angle value to obtain an angle difference, subtracts the prone posture force center position value from the upright posture force center position value to obtain a predetermined force center position difference value, subtracts the real-time force center position value from the upright posture force center position value to obtain a real-time force center position difference value, divides the real-time force center position difference value by the predetermined force center position difference value to obtain a force center position ratio, multiplies the angle difference value by the force center position ratio to obtain an angle change value, and subtracts the angle change value from the upright posture angle value to obtain the trunk angle value.

7. The cushion sensing system according to claim 6, wherein the riding application sums the left-end vertical force data and the right-end vertical force data into a back vertical force value, sums the front-end vertical force data, the left-end vertical force data, and the right-end vertical force data into a total vertical force value, divides the back vertical force value by the total vertical force value to obtain a vertical force ratio, multiplies the sensing device distance data by the vertical force ratio to obtain the real-time force center position value, wherein the sensing device distance data is a distance between the front sensing unit and the back sensing unit.

8. The cushion sensing system according to claim 6, wherein the riding application adds the front-end vertical force data and the left-end vertical force data to obtain a total left-side vertical force value, divides the left-end vertical force data by the total left-side vertical force value to obtain a left-side force center position value, adds the front-end vertical force data and the right-end vertical force data to obtain a total right-side vertical force value, and divides the right-end vertical force data by the total right-side vertical force value to obtain a right-side force center position value.

9. The cushion sensing system according to claim 8, wherein the riding application compares the left-side force center position value and the right-side force center position value, if a difference between the left-side force center position value and the right-side force center position value is greater than a predetermined standard, the riding application determines that the left and right sides of the seat cushion body are not symmetrical.

10. The cushion sensing system according to claim 6, wherein the riding application stores a plurality of vertical force data as a vertical force change data, extracts a plurality of vertical force peak values from the vertical force change data, extracts a time difference between two vertical force peak values, and divides 60 by the time difference to obtain a pedaling frequency value.

* * * * *